United States Patent
Mhadeshwar et al.

(10) Patent No.: US 8,961,891 B2
(45) Date of Patent: Feb. 24, 2015

(54) CATALYTIC ALCOHOL DEHYDROGENATION HEAT SINK FOR MOBILE APPLICATION

(75) Inventors: Ashish B. Mhadeshwar, Storrs, CT (US); Daniel Norton, Niskayuna, NY (US); Robert James Perry, Niskayuna, NY (US); Paul Glaser, Albany, NY (US); Patrick Edward Pastecki, Albany, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1100 days.

(21) Appl. No.: 12/859,921

(22) Filed: Aug. 20, 2010

(65) Prior Publication Data

US 2012/0043053 A1 Feb. 23, 2012

(51) Int. Cl.

| | | |
|---|---|---|
| *B01J 8/02* | (2006.01) | |
| *B64D 33/08* | (2006.01) | |
| *B64D 13/08* | (2006.01) | |
| *B01J 8/00* | (2006.01) | |
| *B01J 35/00* | (2006.01) | |
| *B01J 35/02* | (2006.01) | |
| *B01J 19/00* | (2006.01) | |
| *B01J 19/24* | (2006.01) | |
| *C07C 5/32* | (2006.01) | |
| *C07C 5/42* | (2006.01) | |

(Continued)

(52) U.S. Cl.
CPC ............... *B64D 33/08* (2013.01); *B64D 13/08* (2013.01); *B64D 2013/0614* (2013.01); *B64D 2013/0674* (2013.01); *Y02T 50/56* (2013.01)
USPC ............ 422/211; 422/129; 422/187; 422/198

(58) Field of Classification Search
CPC ........ B01J 19/00; B01J 19/24; B01J 2231/70; B01J 8/00; B01J 8/02; B01J 35/00; B01J 35/02; C07C 5/32; C07C 5/321; C07C 5/324; C07C 5/325; C07C 5/42; C07C 5/48
USPC .................................. 422/129, 187, 198, 211
See application file for complete search history.

(56) References Cited

U.S. PATENT DOCUMENTS

| | | |
|---|---|---|
| 2,941,372 A | 6/1960 | Taylor |
| 3,158,197 A | 11/1964 | Blezard |
| 3,438,602 A | 4/1969 | Noddings et al. |

(Continued)

FOREIGN PATENT DOCUMENTS

JP 2006232607 A * 9/2006

OTHER PUBLICATIONS

Machine translation of JP 2006-232607A, which was published Sep. 7, 2006.*

(Continued)

*Primary Examiner* — Natasha Young
(74) *Attorney, Agent, or Firm* — Bracewell & Giuliani LLP

(57) ABSTRACT

A heat sink is used to absorb heat produced by a vehicle. The heat sink uses an endothermic catalytic alcohol dehydrogenation reaction to assist with the absorption of excess heat produced in the electronics of the vehicle. In some embodiments, the alcohol can be pre-heated by absorbing heat from various components of the vehicle. Excess heat from the various components or from the vehicle engine can be used to vaporize the reaction fluids in order to further absorb additional heat. Reaction fluids can also be sent to the vehicle's engine/burner for use as a supplemental fuel.

12 Claims, 3 Drawing Sheets

(51) Int. Cl.
*C07C 5/48* (2006.01)
*B64D 13/06* (2006.01)

(56) References Cited

U.S. PATENT DOCUMENTS

| | | | |
|---|---|---|---|
| 3,488,226 A | | 1/1970 | Baker et al. |
| 3,522,019 A | * | 7/1970 | Buswell et al. ............... 422/623 |
| 3,549,335 A | | 12/1970 | Grotz, Jr. |
| 3,739,581 A | | 6/1973 | Talmor |
| 3,760,168 A | * | 9/1973 | Boyd ........................... 700/272 |
| 4,273,304 A | | 6/1981 | Frosch et al. |
| 4,505,124 A | | 3/1985 | Mayer |
| 4,705,100 A | | 11/1987 | Black et al. |
| 4,776,536 A | | 10/1988 | Hudson et al. |
| 5,149,018 A | | 9/1992 | Clark |
| 5,151,171 A | | 9/1992 | Spadaccini et al. |
| 5,176,814 A | | 1/1993 | Spadaccini et al. |
| 5,207,053 A | | 5/1993 | Spadaccini et al. |
| 5,232,672 A | | 8/1993 | Spadaccini et al. |
| 5,267,608 A | | 12/1993 | Coffinberry |
| 5,313,790 A | | 5/1994 | Barr |
| 5,337,553 A | | 8/1994 | Barr |
| 5,440,172 A | | 8/1995 | Sutrina |
| 5,667,168 A | | 9/1997 | Fluegel |
| 5,678,408 A | | 10/1997 | Janes |
| 5,692,558 A | | 12/1997 | Hamilton et al. |
| 6,059,995 A | | 5/2000 | Topsoe et al. |
| 6,679,318 B2 | | 1/2004 | Bakke |
| 6,835,354 B2 | | 12/2004 | Woods et al. |
| 2008/0260630 A1 | * | 10/2008 | Pez et al. ........................ 423/651 |
| 2010/0010268 A1 | * | 1/2010 | Shirasawa et al. ............ 568/420 |

OTHER PUBLICATIONS

Junge, H., Bjorn, L. and Beller, M., "Novel Improved Ruthenium Catalysts for the Generation of Hydrogen from Alcohols" The Royal Society of Chemistry, (2007), 522-524.

Ando, Y., Yamashita M. and Saito, Y., "Reaction Mechanism of 2-Propanol Dehydrogenation with a Carbon-Supported Ru—Pt Composite Catalyst in the Liquid Phase" The Chemical Society of Japan, (2003), 2045-2049, 76.

Mooksuwan W. and Kumar, S., "Study on 2-Propanol/Acetone/Hydrogen Chemical Heat Pump: Endothermic Dehydrogenation of 2-Propanol" International Journal of Energy Research, (2000), 1109-1122, 24.

Lee, H., Song, H.K. and Na, B-K., "Preparation of 2-Propanol Dehydrogenation Catalysts for Chemical Heat Pump System" The Chemical Society of Japan, (2000), 1015-1019, 73.

Chung, Y., Hong, S. and Song, H.K., "A Chemical Reaction Heat Pump System Adopting the Reactive Distillation Process" Korea Institute of Science and Technology, 742-747, 1996.

Stern, T. and Anderson, W.G., "High Temperature Lightweight Heat Pipe Panel Technology Development," Proceedings of the Space Nuclear Conference 2005, San Diego, CA, Jun. 5-9, 2005, Paper 1xxx.

Faungnawakij, K., Tanaka, Y., Shimoda, N., Fukunaga, T., Kawashima, S., Kikuchi, F. and Eguchi, K., "Influence of Solid-Acid Catalysts on Steam Reforming and Hydrolysis of Dimethyl Ether for Hydrogen Production," Applied Catalysis A: General, (2006) 40-48, 305, www.elsevier.com/locate/apcata.

Kawabata, T., Matsuoka, H., Shishido, T., Li, D., Tian, Y., Sano, T. and Takehira, K., "Steam Reforming of Dimethyl Ether Over ZSM-5 coupled with Cu/ZnO/Al2O3 Catalyst Prepared by Homogeneous Precipitation," Applied Catalysis A: General, (2006) 82-90, 308, www.elsevier.com/locate/apcata.

Mathew, T., Yamada, Y., Ueda, A., Shioyama, H. and Kobayashi, T., "Metal Oxide Catalysts for DME Steam Reforming: Ga2O3 and Ga2O3—Al2O3 Catalysts With and Without Copper," Applied Catalysis A: General, (2005) 11-22, 286, www.elsevier.com/locate/apcata.

* cited by examiner

CATALYTIC ALCOHOL DEHYDROGENATION HEAT SINK FOR MOBILE APPLICATION

BACKGROUND OF THE INVENTION

1. Technical Field of the Invention

The present invention relates to a method of using a catalytic heat sink with alcohol. More specifically, the invention is drawn toward using the heat sink in mobile applications that generate an abundance of heat from onboard electronics.

2. Background of the Invention

Significant amount of heat is generated from on-board electronics and equipment in mobile applications. In the case of high-speed mobile applications, such as aircraft and other vehicles, this waste heat could be transferred to the fuel itself, which is eventually combusted. However, such heat rejection (heat sink) becomes a challenge when the fuel flow rate is low (e.g. idling). If the fuel temperature exceeds a certain temperature, the electronics can become damaged.

An alternative heat removal technique is to transfer excess heat into the vehicle's liquid fuel. Aircraft, for example, typically have a large amount of fuel on-board, thus making it convenient to transfer heat to the fuel before the fuel is consumed by the engine. Heating the fuel may also improve the fuel efficiency of the jet engine. However, the heat capacity of the fuel is limited. Components that come into contact with the fuel, such as seals, valves, and electronic components, may be damaged if the fuel is too hot. Furthermore, the fuel itself has a finite capacity for heat. In some circumstances, aircraft missions must end early, not because of lack of fuel, but because of lack of available heat sink capacity. Therefore, an alternative technique to remove excess heat from an aircraft, without increasing the thermal signature of the aircraft, is desirable.

Modern aircraft also contain advanced insulation systems, which further exacerbates the problem of easily dissipating internally generated heat. As noted above, methods known prior generally rely on the vehicle's liquid fuel; however, it is typically infeasible to use the liquid fuel while an aircraft is idling.

Therefore, it would be beneficial to have a method and apparatus that advantageously addresses at least one of these needs.

SUMMARY OF THE INVENTION

The present invention is directed to a method that satisfies at least one of these needs. One embodiment of the present invention provides for an apparatus for use as a catalytic alcohol dehydrogenation heat sink for a mobile vehicle. In one embodiment, the apparatus can include a first vessel, a second vessel, a heat source, a reaction zone, and a catalyst disposed within the reaction zone. The first vessel being operable to have a volume of alcohol contained therein, and the second vessel being operable to have a volume of jet fuel contained therein. The heat source preferably includes onboard electronics for generating heat. The reaction zone can be in fluid communication with the first vessel and can be in thermal communication with the heat source. The catalyst can be operable to promote an endothermic dehydrogenation reaction of the alcohol to create a reaction fluid that includes unreacted alcohol, hydrogen, and a dehydrogenated hydrocarbon product. Depending on the type of alcohol, the dehydrogenated hydrocarbon product can be an aldehyde or a ketone.

In another embodiment, the reaction zone is not in fluid communication with the second vessel. In a preferred embodiment, the catalyst is operable to dehydrogenate at least a portion of the alcohol at a temperature within the range from 0° C. to 150° C. Exemplary alcohols include isopropanol, butanol, pentanol, and combinations thereof.

In another embodiment, the apparatus can also include a separator that is operable to remove the unreacted alcohol from the reaction fluid, such that the unreacted alcohol can be recycled back to the first vessel, or to some other advantageous point within the apparatus. In another embodiment, the apparatus can also include a burner that is in fluid communication with the second vessel and the reaction zone. The burner is preferably part of a jet engine, and can be operable to burn jet fuel, unreacted alcohol, the dehydrogenated product, and hydrogen.

In one embodiment, the catalyst can include an active metal component and a support component. Preferred active metal components include rhodium, ruthenium, and combinations thereof, with rhodium being most preferred. Preferred support components include alumina, activated carbon, and combinations thereof, with alumina being most preferred. In one embodiment, the weight ratio of the active metal component to the total weight of the catalyst is 1:20.

In another embodiment, the present invention provides an apparatus for use as a catalytic alcohol dehydrogenation heat sink for a mobile vehicle. In this embodiment, the apparatus can include a first vessel, a second vessel, onboard electronics, a heat exchanger and a volume of catalyst. The first vessel is operable to have a volume of isopropanol contained therein, and the second vessel is operable to have a volume of jet fuel contained therein. The onboard electronics can generate the heat that is useful for promoting an endothermic reaction. The heat exchanger can be disposed within the mobile vehicle, and includes a hot side and a cold side. The hot side can be in thermal communication with the heat from the onboard electronics, and the cold side can be in fluid communication with the first vessel, such that the cold side is adaptable for receiving at least a portion of the volume of the isopropanol from the first vessel. The volume of catalyst can be operable to promote the dehydrogenation of isopropanol.

In another embodiment, the apparatus can further include a third vessel having a thermal fluid in thermal communication with the onboard electronics and the heat exchanger. The thermal fluid can transfer the heat from the onboard electronics to the hot side of the heat exchanger in order to provide the heat required to initiate a dehydrogenation reaction with isopropanol in the presence of the catalyst. Exemplary thermal fluids include jet fuel, oil, water, polyalpha-olefin (PAO), and air.

In yet another embodiment, the present invention provides a method for using a catalytic heat sink using isopropanol to cool a vehicle. The method includes the steps of providing a catalyst to a reaction, generating heat from a heat source, feeding the alcohol from a first vessel to the reaction zone, heating the alcohol to a reaction temperature, and dehydrogenating the alcohol in an endothermic reaction to create a reaction product. The reaction product can include hydrogen, unreacted alcohol, and a dehydrogenated product. The dehydrogenated product can be a ketone or an aldehyde depending on the type of alcohol used. The reaction zone is in thermal communication with the heat source such that the reaction zone is operable to transfer heat from the heat source to the reaction zone. The alcohol is heated to the reaction temperature using the heat removed from the heat source. An exemplary reaction temperature is within a range between 0° C. and 80° C. In another embodiment, the temperature is within a range between 25° C. and 65° C. In one embodiment, the method is operable to provide heat removal from the heat source while the mobile vehicle is idle.

In one embodiment, the heat source includes onboard electronics. In another embodiment, the method can also include vaporizing the dehydrogenated hydrocarbon product following the dehydrogenating step, such that additional heat is removed from the heat source. In another embodiment, the method can further include the step of removing the dehydrogenated hydrocarbon product and hydrogen from the reaction zone and feeding at least a portion of the dehydrogenated hydrocarbon product and hydrogen to a burner for use as a secondary fuel. Any unreacted alcohol can also be removed from the reaction zone, and sent to the burner or recycled back to the first vessel. Exemplary separating means can include a flash vessel, combination of vapor/liquid separation in combination with membrane separation, pressure swing adsorption, and the like.

Exemplary alcohols include isopropanol, butanol, and pentanol, with isopropanol being preferred.

The catalyst is operable to promote the endothermic dehydrogenation reaction of the alcohol. The catalyst has an active metal on a support. Preferred active metal components include rhodium, ruthenium, and combinations thereof, with rhodium being most preferred. Preferred support components include alumina, activated carbon, and combinations thereof, with alumina being most preferred. In one embodiment, the weight ratio of the active metal component to the total weight of the catalyst is from 1:1000 to 1:20. In one embodiment, the reaction zone can include a catalyst loading system. Exemplary catalyst loading systems include a catalyst packed bed, a catalyst fluidized bed, and a catalyst washcoat.

BRIEF DESCRIPTION OF THE DRAWINGS

So that the manner in which the above-recited features, advantages, and objectives of the invention, as well as others that will become apparent, are attained and can be understood in detail, more particular description of the invention briefly summarized above may be had by reference to the embodiments thereof that are illustrated in the drawings that form a part of this specification. It is to be noted, however, that the appended drawings illustrate only several embodiments of the invention and are, therefore, not to be considered limiting of the invention's scope, for the invention may admit to other equally effective embodiments.

DETAILED DESCRIPTION

Figure 1:
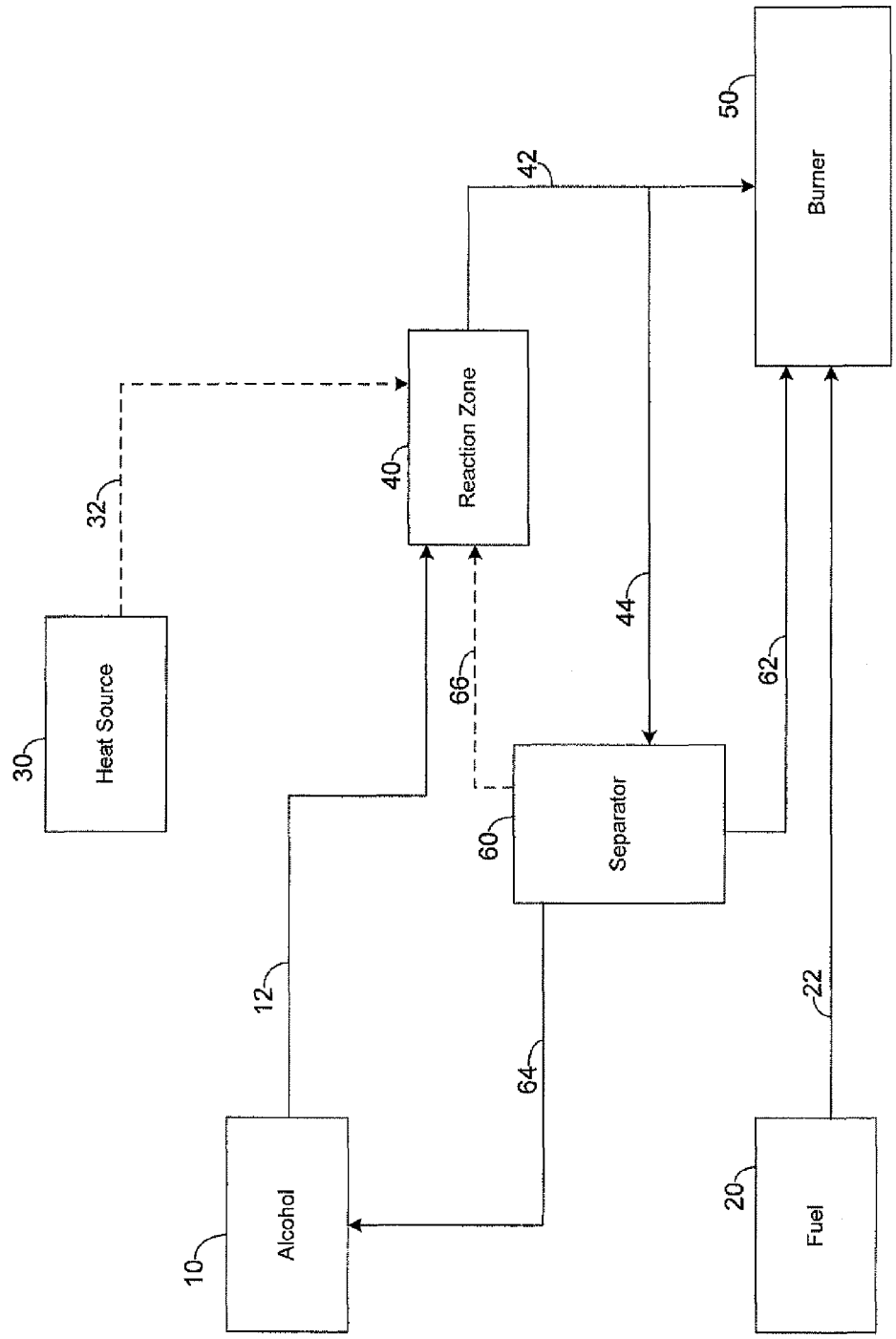
FIG. 1 is an illustration displaying an embodiment of the present invention.

Although the following detailed description contains many specific details for purposes of illustration, one of ordinary skill in the art will appreciate that many variations and alterations to the following details are within the scope and spirit of the invention. Accordingly, any exemplary embodiments of the invention described herein are set forth without any loss of generality to, and without imposing limitations thereon, the present invention.

Alcohols are generally classified into primary, secondary and tertiary, based upon the number of carbon atoms connected to the carbon atom that bears the hydroxyl group. Namely, the primary alcohols have general formulas $RCH_2$—OH; secondary alcohols are $RR'CH$—OH; and tertiary alcohols are $RR'R''C$—OH, where R, R' and R" stand for alkyl groups. Ethanol and n-propyl alcohol are primary alcohols, and isopropyl alcohol is a secondary alcohol.

In a typical dehydrogenation reaction of alcohol, the alcohol combines with heat in the presence of a suitable catalyst to yield hydrogen gas and either a ketone or an aldehyde. The generic dehydrogenation reaction of an alcohol is expressed below:

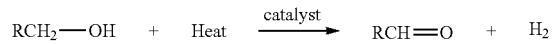

Primary alcohols ($R$—$CH_2$—$OH$) are dehydrogenized to aldehydes ($R$—$CHO$), whereas secondary alcohols ($RR'CH$—$OH$) are dehydrogenized to ketones ($RR'C$—$OH$). In a preferred embodiment, isopropanol ("IPA") can be dehydrogenized to form acetone and hydrogen according to the following reaction:

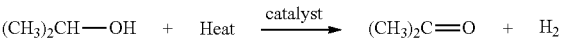

In this reaction, IPA is heated from room temperature to a reaction temperature. When the IPA reaches this temperature and is in the presence of an acceptable catalyst, the IPA converts to acetone and hydrogen while also absorbing energy, thereby lowering the temperature. Additional heat can be absorbed by vaporizing the acetone and any unreacted IPA. Exemplary catalyst include, for example, an activated metal of rhodium or ruthenium on a support of alumina or activated carbon. Preferred catalyst include ruthenium on carbon and rhodium on alumina, with rhodium on alumina being most preferred.

In one embodiment, a synthesized ruthenium catalyst can be prepared by making an aqueous solution of ruthenium chloride, adding the solution to activated carbon, and then adding sodium borohydride. A 5% metal to total mass of the catalyst is preferred. In various embodiments of the present invention, the catalyst can be placed inside a heat exchanger, a separate reaction zone, or added with the alcohol at various points within the apparatus.

The advantage of using of IPA, as opposed to using jet fuel as described in the Background, can be seen in Table I below:

TABLE I

Heat Sink Capacity for Various Fluids at Different Temperatures

| | Heat Sink (J/g) | |
|---|---|---|
| Fluid | 64° C. | 80° C. |
| Jet Fuel | 78 | 110 |
| IPA | 107 | 156 |
| IPA (2.1% conversion) | 147 | — |
| IPA (3.9% conversion) | 183 | — |

Generally speaking, IPA provides an additional heat sink capability of approximately 40% over jet fuel even without any conversion. Furthermore, with every 2% conversion of IPA, an additional 40 J/g of heat can be absorbed. However, the dehydrogenation of IPA is equilibrium limited. Therefore, removal of the reaction products from reaction zone can greatly increase the efficiency of the overall reaction, leading to additional removal of heat.

Now referring to FIG. 1, catalytic alcohol dehydrogenation heat sink ("CADHS") may be used to absorb or transfer heat from various heat sources. CADHS may be used, for example, to reduce heat in a vehicle such as an aircraft or an automobile. Exemplary aircraft include airplanes, jets, helicopters, space shuttles, and rockets. Furthermore, CADHS may be used in any other equipment requiring a heat sink. Sources of heat on an aircraft may include, for example, electronics, and the like. Electronics can include avionics or any other electrical or electronic equipment located on an aircraft.

The CADHS can include first vessel [10], which contains alcohol, and second vessel [20], which contains fuel. The CADHS also can include heat source [30], reaction zone [40], and burner [50]. First vessel [10] is in fluid communication with reaction zone [40] via line [12] and second vessel [20] is in fluid communication with burner [50] via line [22]. Second vessel [20] contains fuel that is sent to burner [50] for use as a primary fuel. The CADHS can optionally include separator [60].

In one embodiment, heat source [30] includes electrical equipment located on the vehicle. In an aircraft this would include, for example, avionics; communications, navigation and monitoring hardware; collision-avoidance systems; weather systems and radar; electro-optics; electronic support measures and defensive aids systems and the like. When the vehicle is operational, the electrical equipment within heat source [30] produces heat. At certain temperatures, the electrical equipment can become damaged. In an embodiment of the present invention, heat source [30] is in thermal communication [32] with reaction zone [40] such that heat energy is transferred from heat source [30] to reaction zone [40]. This advantageously lowers the temperature within heat source [30], while also increasing the temperature within reaction zone [40] in order to enable a catalytic dehydrogenation reaction when alcohol from first vessel [10] is fed into reaction zone [40] in the presence of a catalyst. This reaction is an endothermic reaction, thereby reducing the temperature within reaction zone [40] and allowing additional heat energy to be transferred from heat source [30].

The endothermic reaction creates a reaction fluid that includes hydrogen and either an aldehyde or a ketone. The reaction fluid can also include unreacted alcohol. This reaction fluid can then be sent to burner [50] via line [42] to be burned and used as a supplementary fuel. In an optional embodiment, at least a portion of the reaction fluid can be sent to separator [60] via line [44]. At least a portion of the unreacted alcohol can be separated from the reaction fluid and recycled to first vessel [10] via line [64] or reintroduced directly to reaction zone [40] via line [66]. The remaining components of the reaction fluid can then be sent to burner [50] via line [62] to be used as a supplementary fuel.

In an additional embodiment not shown, separator [60] can separate the reaction fluid into three separate component streams, sending the hydrogen to burner [50], sending unreacted alcohol to first vessel [10] or reaction zone [40], and vaporizing the aldehyde/ketone in order to absorb additional heat energy from heat source [30]. Vaporization can be accomplished by absorption of additional heat energy from heat source such that the temperature rises above the respective boiling point. Additionally, in embodiments in which the CADHS is operating under increased pressures, vaporization can also be accomplished by reducing the pressure of the system.

Figure 2:
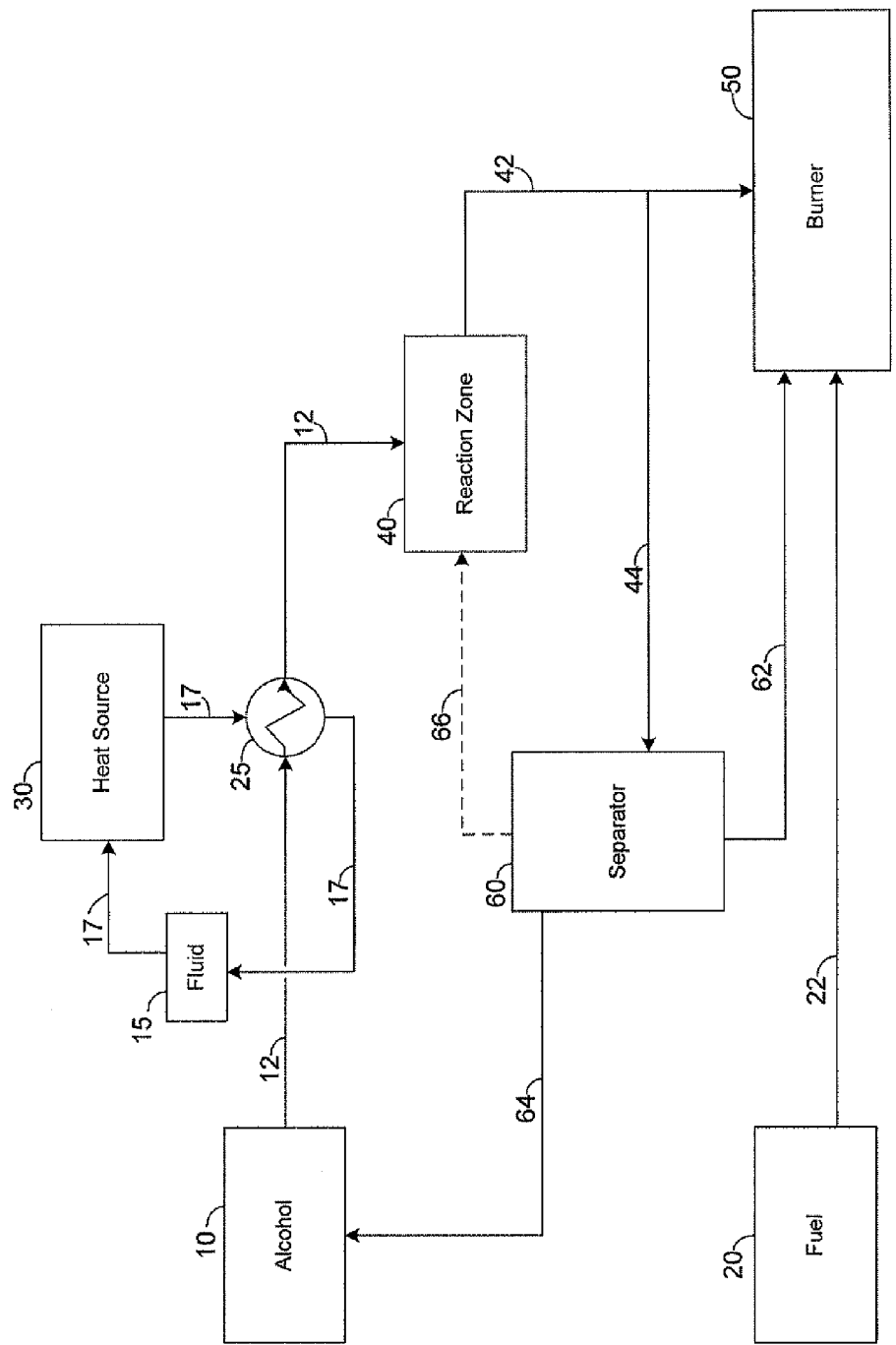
FIG. 2 is an illustration displaying an embodiment of the present invention.

Referring to FIG. 2, a thermal fluid is contained within third vessel [15]. The thermal fluid is used to absorb heat from heat source [30] via line [17]. The heated thermal fluid then passes through the hot side of heat exchanger [25] and transfers its heat energy to the alcohol from first vessel [10] that enters the cold side of heat exchanger [25] via line [12]. The alcohol is now heated to a temperature that enables an endothermic reaction, such that once the alcohol is introduced to reaction zone [40] in the presence of the suitable catalyst, the alcohol undergoes an endothermic dehydrogenation reaction. While FIG. 2 shows an embodiment in which heat exchanger [25] and reaction zone [40] are separate units, reaction zone [40] and heat exchanger [25] can be combined into one unit.

The endothermic reaction creates a reaction fluid that includes hydrogen and either an aldehyde or a ketone. The reaction fluid can also include unreacted alcohol. This reaction fluid can then be sent to burner [50] via line [42] to be burned and used as a supplementary fuel. In an optional embodiment, at least a portion of the reaction fluid can be sent to separator [60] via line [44]. At least a portion of the unreacted alcohol can be separated from the reaction fluid and recycled to first vessel [10] via line [64] or reintroduced directly to reaction zone [40] via line [66]. The remaining components of the reaction fluid can then be sent to burner [50] via line [62] to be used as a supplementary fuel.

In an additional embodiment not shown, separator [60] can separate the reaction fluid into three separate component streams, sending the hydrogen to burner [50], sending unreacted alcohol to first vessel [10] or reaction zone [40], and vaporizing the aldehyde/ketone in order to absorb additional heat energy from heat source [30]. Vaporization can be accomplished by absorption of additional heat energy from heat source such that the temperature rises above the respective boiling point. Additionally, in embodiments in which the CADHS is operating under increased pressures, vaporization can also be accomplished by reducing the pressure of the system.

Figure 3:
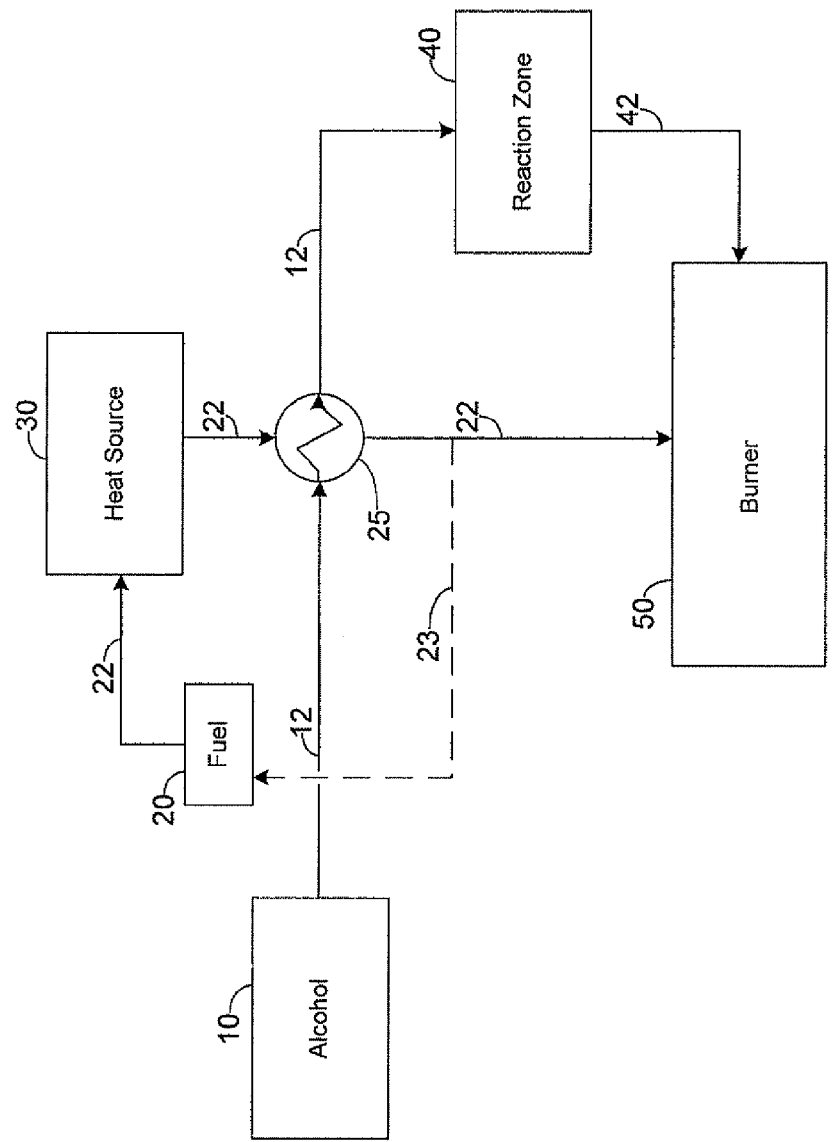
FIG. 3 is an illustration displaying an embodiment of the present invention.

FIG. 3 represents a simplified CADHS system in which fuel from second vessel [20] is used as the thermal fluid. In this embodiment, the fuel is used to transfer the heat energy from heat source [30] to the alcohol before the fuel is sent to burner [50]. Additionally, a portion of the fuel may be recycled back to second vessel [20] via line [23]. While FIG. 3 does not show separator [60], those of ordinary skill in the art will recognize that separator [60] could be easily incorporated into the design. Additionally, like FIG. 2, reaction zone [40] and heat exchanger [25] can be combined into one unit.

As will be readily apparent to those skilled in the art, the present invention may easily be produced in other specific forms without departing from its spirit or essential characteristics. The presented embodiments are, therefore, to be considered as merely illustrative and not restrictive, the scope of the invention being indicated by the claims rather than the foregoing description, and all changes which come within the meaning and range of equivalence of the claims are therefore intended to be embraced therein. The present invention may suitably comprise, consist or consist essentially of the elements disclosed and may be practiced in the absence of an element not disclosed.

We claim:

1. An apparatus for use as a catalytic alcohol dehydrogenation heat sink for a mobile vehicle, the apparatus comprising:
   a first vessel operable to have a volume of alcohol contained therein;
   a second vessel operable to have a volume of jet fuel contained therein;

a heat source comprising onboard electronics for generating heat;

a reaction zone in fluid communication with the first vessel and in thermal communication with the heat source;

a burner in fluid communication with the second vessel and the reaction zone; and a catalyst disposed within the reaction zone, the catalyst operable to promote an endothermic dehydrogenation reaction of the alcohol to create a reaction fluid comprised of unreacted alcohol, hydrogen, and a dehydrogenated hydrocarbon product, wherein the dehydrogenated hydrocarbon product is an aldehyde or a ketone, wherein the burner is operable to burn jet fuel, unreacted alcohol, the dehydrogenated hydrocarbon product, and hydrogen.

2. The apparatus of claim 1, wherein the reaction zone is not in fluid communication with the second vessel.

3. The apparatus of claim 1, wherein the catalyst is operable to dehydrogenate at least a portion of the alcohol at a temperature supplied to the reaction zone within the range from 0° C. to 150° C.

4. The apparatus of claim 1, wherein the catalyst is operable to dehydrogenate at least a portion of the alcohol at a temperature supplied to the reaction zone within the range from 0° C. to 80° C.

5. The apparatus of claim 1, wherein the alcohol is selected from the group consisting of isopropanol, butanol, pentanol, and combinations thereof.

6. The apparatus of claim 1, further comprising a separation zone operable to remove the unreacted alcohol from hydrogen and dehydrogenated hydrocarbon product.

7. The apparatus of claim 1, wherein the catalyst comprises an active metal component and a support component, wherein the active metal component is selected from the group consisting of rhodium, ruthenium, and combinations thereof, wherein the support component is selected from the group consisting of alumina, activated carbon, and combinations thereof.

8. The apparatus of claim 1, wherein the catalyst comprises an active metal component and a support component, wherein the active metal component is rhodium and the support component is alumina.

9. The apparatus of claim 8, wherein the weight ratio of the active metal component to the total weight of the catalyst is from 1:1000 to 1:20.

10. An apparatus for use as a catalytic alcohol dehydrogenation heat sink for a mobile vehicle, the apparatus comprising:

a first vessel operable to have a volume of isopropanol contained therein;

a second vessel operable to have a volume of jet fuel contained therein;

onboard electronics for generating heat; and a heat exchanger disposed within the mobile vehicle, the heat exchanger comprising:

a hot side in thermal communication with the heat from the onboard electronics;

a cold side in fluid communication with the first vessel, the cold side adaptable for receiving at least a portion of the volume of the isopropanol from the first vessel; and a volume of catalyst, the catalyst operable to promote isopropanol dehydrogenation.

11. The apparatus of claim 10, further comprising a third vessel having a thermal fluid in thermal communication with the onboard electronics and the heat exchanger, wherein the thermal fluid is operable to transfer the heat from the onboard electronics to the heat exchanger to provide the heat required to initiate a dehydrogenation reaction with isopropanol in the presence of the catalyst.

12. The apparatus of claim 11, wherein the thermal fluid is selected from the group consisting of the jet fuel, oil, water, polyalpha olefin, air, and combinations thereof.

* * * * *